United States Patent [19]

Puchinger et al.

[11] Patent Number: 4,838,942
[45] Date of Patent: Jun. 13, 1989

[54] DISPERSION FOR PROTECTIVE COATINGS AND METHOD FOR APPLYING SUCH COATINGS

[75] Inventors: Frans Puchinger, Niederscheyern; Gerhard Wydra, Oberschleissheim, both of Fed. Rep. of Germany

[73] Assignee: MTU-Motoren-und Turbinen-Union Muenchen GmbH, Munich, Fed. Rep. of Germany

[21] Appl. No.: 137,176

[22] Filed: Dec. 23, 1987

[30] Foreign Application Priority Data

Dec. 23, 1986 [DE] Fed. Rep. of Germany ....... 3644116

[51] Int. Cl.$^4$ .......................... C09D 1/00; B05D 1/18
[52] U.S. Cl. .................................. 106/286.1; 148/258; 106/286.5; 106/286.4; 106/286.7; 106/14.12
[58] Field of Search .................... 148/6.16; 106/286.1, 106/287.29, 14.12, 286.5, 286.7, 286.6

[56] References Cited

U.S. PATENT DOCUMENTS

| | | | |
|---|---|---|---|
| 4,227,946 | 10/1980 | Williamson | 148/6.16 |
| 4,243,434 | 1/1981 | Hartley | 148/6.16 |
| 4,381,323 | 4/1983 | Lowe | 148/6.16 |
| 4,650,699 | 3/1987 | Mosser | 148/6.16 |

*Primary Examiner*—Sam Silverberg
*Attorney, Agent, or Firm*—W. G. Fasse; D. H. Kane, Jr.

[57] ABSTRACT

Synthetic material substrates are protected against erosion and corrosion by a lacquer type coating which is baked or bonded onto the substrate at relatively low temperatures below 200° C. to protect the synthetic material substrate against damage. The coating is a dispersion of metal powder in an aqueous solution of about equal weight proportions of phosphorous acid and phosphoric acid with an optional weight proportion of not more than 5 percent of aluminum phosphate, and about 10 to 20 weight percent of chromic acid. The remainder is water.

6 Claims, No Drawings

DISPERSION FOR PROTECTIVE COATINGS AND METHOD FOR APPLYING SUCH COATINGS

FIELD OF THE INVENTION

The invention relates to a dispersion for forming protective coatings on surfaces, especially of synthetic materials. The invention also relates to methods for applying the dispersion to the surface of a substrate to form the protective coating.

DESCRIPTION OF THE PRIOR ART

It is known to use chromic acid and acids of phosphorus or the salts of these acids as binding agents in anorganic coatings. Reference is made in this connection to German Patents 1,519,395 and 2,006,095.

However, protective coatings based on the above mentioned binding agents or binding solutions require a baking or curing temperature of about 350° C. and more. Thus, these conventional protective coatings are suitable only for steel products or for materials capable of withstanding these high baking temperatures. Such conventional coatings are not suitable for structural components made of synthetic materials for which these baking temperatures are too high.

OBJECTS OF THE INVENTION

In view of the foregoing it is the aim of the invention to achieve the following objects singly or in combination:

to provide a coating material that will require a substantially lower baking temperature than was necessary heretofore, and which nevertheless is erosion and corrosion resistant for many purposes and operating conditions;

to provide a protective coating material which is especially suitable for coating structural components of synthetic materials of all kinds, including thermosetting materials and even certain thermoplastic synthetic materials; and to provide several methods for the application of the corrosion protective coating to surfaces of temperature sensitive materials.

SUMMARY OF THE INVENTION

According to the invention a binder solution is prepared which comprises about 10 to 20 percent by weight of chromic acid ($CrO_3$), about equal proportions of phosphorus acid ($H_3PO_3$) and phosphoric acid ($H_3PO_4$) of 20 to 30 percent by weight each, and aluminum phosphate ($AlPO_4$) of about 0 to 5 percent by weight, the remainder being water. It has been found that this binding agent or binder solution requires a surprisingly low baking temperature below about 200° C., preferably within the range of 150° to 190° C.

A metal powder is introduced into the binder solution, either to form a dispersion prior to application of the dispersion to the surface to be coated, or after the binding solution has been baked onto the surface, whereby the metal powder is introduced into the binder in a compression mold to perform a so-called compressing cementing or packing cementing.

DETAILED DESCRIPTION OF PREFERRED EXAMPLE EMBODIMENTS AND OF THE BEST MODE OF THE INVENTION

The binding solution and the metal powder are mixed in about equal weight proportions. The metal powder is selected from the group consisting of aluminum, silver, gold, copper, titanium, palladium, tin, and alloys of the foregoing. These metals are good electrical conductors and the resulting protective coating is also a good electrical conductor which is desirable in many instances, for example, to provide some lightning protection.

The present coatings have a superior bonding strength between the surface of the synthetic material and the protective coating compared to conventional galvanically applied coatings due to an insufficient bonding strength between galvanic coatings and the respective substrates of synthetic materials. Even where conventional methods achieve a sufficient bonding strength between a galvanic coating and a synthetic material substrate, such bonding strength is achieved heretofore by substantial additional efforts, such as properly preparing the substrate surface for the galvanizing and so forth.

It has been found that the present coatings may be applied to heat curing epoxy resins, to polyimide resins, to phenolic resins with or without filler materials, and to all types of fiber-reinforced composite materials including polybenzimidazole (PBI).

Where the protective coating is applied to the substrate in the form of the dispersion, the metal powder or powders are mixed into the binder solution to form the dispersion which then may be applied to the surface to be protected in any one of several ways, for example, by dipping, by a brush application, or by a wiping application, or by roller printing the dispersion onto the surface or by any other chemical or physical application. After the application the substrate, together with the dispersion coating, is heated to a temperature below 200° C. and such heating may, for example, be accomplished by a radiation heating, including a microwave heating or similar electromagnetic or high energy radiation, including infrared radiation. After the heat treatment the coating may be subjected to a so-called densifying step, for example, by impinging glass beads under pressure onto the surface, by wiping, by brushing or similar steps. Such steps even improve the electrical conductivity or resistivity. For example, where titanium power is used, the electrical surface resistivity was 200 ohm-cm, and after the densifying treatment is was 1 ohm-cm.

The present protective coating may also be applied by first applying the binder solution to the substrate and then baking the binder solution to an extent that it remains slightly tacky. Then the metal powder is placed into a compression mold and the substrate with its tacky binder solution on its surface is placed into the mold so that the metal powder is caused to disperse into the binder solution when pressure is applied to the compression mold, whereby a compression cementing of the metal powder in the binder solution and of the coating to the substrate is achieved. The pressure to be applied in the compression mold is preferably within a conventional range suitable for cold isostatic pressing.

It has been found that the structural component of synthetic material is most gently treated when the heat or temperature curing of the coating is done by using microwave energy.

The present coating is especially suitable for protecting fiber-reinforced synthetic materials and components made of such materials, for example in the air- and spacecraft industry, including propulsion plant housing components, fan vanes of fiber-reinforced composite materials, including components for prop fans, and other compressors, blowers, pumps, and so forth. However, other components requiring such a coating may be protected in accordance with the invention.

Under suitable circumstances, the heat curing at relatively low temperatures may also be accomplished by elecromagnetic or high energy radiation, such as ultraviolet radiation or infrared radiation at lower energy levels. In any event, the curing results in a cross-linking of the binder solution.

The metals listed above could possibly be replaced by other suitable metals. In any event, the particle size of the metal powders used, is preferably within a range suitable for conventional cold isostatic pressing.

Although the invention has been described with reference to specific example embodiments, it will be appreciated, that it is intended to cover all modifications and equivalents within the scope of the appended claims.

What we claim is:

1. A dispersion for forming a protective coating on a substrate, comprising a binder solution and a metal powder dispersed in said binder solution, said binder solution comprising chromic acid ($CrO_3$) 10 to 20 percent by weight of the binder solution, phosphorous acid ($H_3PO_3$) 20 to 30 percent by weight, phosphoric acid ($H_3PO_4$) 20 to 30 percent by weight, aluminum phosphate ($AlPO_4$) 0 to 5 percent by weight, and the remainder being water, said binder solution and said metal powder being present in about equal weight proportions, said dispersion having a baking temperature within the range of about 150° C. to about 200° C.

2. The dispersion of claim 1, wherein said metal powder includes electrically conducting metal powder.

3. The dispersion of claim 2, wherein said electrically conducting metal powder is selected from the group consisting of aluminum, silver, gold, copper, titanium, palladium, tin, and alloys of the foregoing.

4. The dispersion of claim 1, wherein said metal powder comprises aluminum powder and titanium powder in equal weight proportions.

5. The dispersion of claim 1, wherein said aluminum phosphate is present in a weight proportion within the range of 0 to 2.5 percent.

6. A dispersion for forming a protective coating on a substrate, comprising a binder solution and a metal powder dispersed in said binder solution, said binder solution comprising chromic acid ($CrO_3$) 10 to 20 percent by weight of the binder solution, phosphorous acid ($H_3PO_3$) 20 to 30 percent by weight, phosphoric acid ($H_3PO_4$) 20 to 30 percent by weight, aluminum phosphate ($AlPO_4$) 0 to 5 percent by weight, and the remainder being water, said binder solution and said metal powder being present in about equal weight proportions said dispersion having a baking temperature within the range of about 150° C. to about 200° C. and, said dispersion forming a coating capable of densification after a curing step, so that said surface coating has a substantially reduced surface resistivity after densification as compared to a surface resistivity of the same coating prior to densification.

* * * * *